(12) United States Patent
Jegatheeson

(10) Patent No.: US 7,475,763 B2
(45) Date of Patent: Jan. 13, 2009

(54) ONE-WAY CLUTCHES

(75) Inventor: Muthuvetpillai Jegatheeson, Auckland (NZ)

(73) Assignee: Uniclutch Limited, Auckland (NL)

( * ) Notice: Subject to any disclaimer, the term of this patent is extended or adjusted under 35 U.S.C. 154(b) by 159 days.

(21) Appl. No.: 10/534,465

(22) PCT Filed: Nov. 11, 2003

(86) PCT No.: PCT/NZ03/00251

§ 371 (c)(1),
(2), (4) Date: Mar. 13, 2006

(87) PCT Pub. No.: WO2004/044449

PCT Pub. Date: May 27, 2004

(65) Prior Publication Data

US 2006/0237276 A1     Oct. 26, 2006

(30) Foreign Application Priority Data

Nov. 11, 2002   (NZ)  ........................ 522552

(51) Int. Cl.
*F16D 11/00*     (2006.01)
(52) U.S. Cl. ..................................................... 192/46
(58) Field of Classification Search ............... 74/810.1, 74/425
See application file for complete search history.

(56) References Cited

U.S. PATENT DOCUMENTS

| | | | | |
|---|---|---|---|---|
| 5,690,202 A * | 11/1997 | Myers | .......................... | 192/46 |
| 6,036,174 A * | 3/2000 | Andersen | ..................... | 254/343 |
| 6,244,965 B1* | 6/2001 | Klecker et al. | ................ | 464/81 |
| 6,484,608 B1* | 11/2002 | Ziavras | ....................... | 74/810.1 |
| 6,499,576 B2* | 12/2002 | Wafler | ...................... | 192/48.92 |
| 6,854,577 B2* | 2/2005 | Ruth | ........................... | 192/46 |
| 7,258,214 B2* | 8/2007 | Pawley et al. | .............. | 192/43.1 |

FOREIGN PATENT DOCUMENTS

| | | |
|---|---|---|
| FR | 526122 | 10/1921 |
| GB | 2152160 | 7/1985 |
| SU | 1259062 | 9/1986 |

* cited by examiner

*Primary Examiner*—Dirk Wright
(74) *Attorney, Agent, or Firm*—Young & Thompson (57) ABSTRACT

One-way clutches having different numbers of pawls (1006, 1007) and pockets in a "vernier" arrangement minimize relative rotation between the two clutch halves (101, 102) in the engagement direction. Noise is also reduced. Directionally sensitive biasing elements (1008) rather than springs are used in one-way clutches for extending or retracting inertially balanced swivelling pawls (1006,1007). In another embodiment, a reversible one-way clutch uses a gear train to drive a worm screw synchronized with teeth on a driven worm gear, when freewheeling. Controlled backlash places the worm in either a contact mode (when engagement occurs) or a non-contact (disengaged) mode when driven in an opposite direction.

10 Claims, 5 Drawing Sheets

ONE-WAY CLUTCHES

FIELD

This invention relates to mechanical coupling devices known as "free-wheeling clutches" or "one-way clutches"; devices including mechanisms capable of applying a torque between apposed parts in order to transmit rotation in one direction as determined by relative speed of rotation of the parts, but not in the other direction.

BACKGROUND

Free-wheeling clutches comprise internally controlled coupling means for coupling between a pair of co-axial shafts. Usually a number of sets of reversible locking mechanisms are replicated in a circumferential array. A one-way clutch should allow free relative movement (free-wheeling) of a first component in relation to a second component when the relative motion between the components is in a first direction (for example, a positive direction), but should not allow the relative motion to become negative. The clutch should lock the two components as soon as the relative motion tends to become negative. A one-way clutch can be regarded as a mechanical equivalent to an electrical diode—a device for transmitting power in only one direction.

Free-wheeling or one-way clutches are used in many mechanical engineering applications. For example, bicycle chain drives have a ratchet-based one-way clutch which prevents the chain and cranks being turned by the wheel when the rider is coasting. They are used in automatic transmissions in land vehicles. They are used in machines for making electric energy in a dynamo driven by reciprocating motion, such as to-and-fro wave motion.

Existing one-way clutches rely on various locking mechanisms to reversibly lock the first and second shafts. One class of locking mechanism is of the ratchet type, with one or more spring-loaded pawls (also called struts) on a first assembly reversibly engaging with a corresponding number of pockets on a second, apposed assembly. Unless counteractive steps are taken, this class produces a clicking noise during free-wheeling and exhibits backlash, but when engaged the pawls provide an effective direct coupling of torque without undue stress to materials. Another class involves a wedging action between either a strut, sprag, ball, or roller which enters and becomes jammed within a tapered recess when engaged. Usually a number of sets of locking mechanisms are replicated in a circumferential array. While these one-way clutches are relatively noiseless and have little backlash, the wedging action inherently focuses a significant strain on a small surface area where the strut, sprag, ball, or roller makes contact, amplified by the tangent of the taper and by excessive torque. The wedging action (after a little backlash) significantly magnifies the force applied per unit area It is likely that the material will show permanent distortion at the surface and this type of one-way clutch typically has a short life.

Reverting to ratchet types, there is a particular class of radially oriented, planar one-way clutches employing spring-loaded pawls (struts) to reversibly connect between the parts. Existing one-way clutches of this type exhibit a certain amount of reverse motion (also known as backlash) before the parts turn into a co-engagement position and become locked together. By the time positive engagement occurs some momentum may build up and the impulse occurring at the time of contact may be harmful. It may shock the materials to such an extent that fatigue occurs (if only after a number of cycles), hence the clutch parts must be made strong enough to resist failure. In the case of power-generating machines including one-way clutches, the backlash motion may cause considerable forces that may affect many components of the transmission.

Vibration or noise are other likely problems. If resilient members are used to buffer the impacts, unexpected resonances may occur and the resilient material will fail in time.

No prior art is known in relation to Example A or to Example C (as detailed below). In relation to Example B, prior-art biasing means lacking directional sensing are widely known; most are springs. Ruth (U.S. Pat. No. 6,116,394), provides a running-rail solution to the noise problem.

OBJECT

It is an object of this invention to provide an improved form of one-way clutch, or at least to provide the public with a useful choice.

STATEMENT OF INVENTION

In a first broad aspect, the invention provides a one-way clutch for providing coupling between a first rotatable shaft having an axis of rotation, and a second, abutting, rotatable shaft having a co-axial axis of rotation, the one-way clutch being capable of coupling the shafts if the first shaft is rotated in an engaging direction relative to the second shaft but of uncoupling the shafts if the first shaft is rotated in a opposite, coasting direction relative to the second object, wherein the one-way clutch includes a first support frame, plate, or ring, held upon the first shaft, the first ring supporting a first integer number n, greater than one, of pawl members each having a free end and a supported end separated by a rigid portion, each member being evenly spaced about a co-axial locus on a first end face of the first ring and the free end of each being directed towards a second support frame or ring, the second support frame, plate, or ring, held upon the second shaft and adjacent to the first ring, the second ring bearing a second integer number m, greater than one, of pockets each capable of receiving a free end of one of the members, each pocket being evenly spaced about a co-axial locus on a second end face of the second ring, each pocket being capable of reversibly engaging with an apposed member, wherein the numbers n and m are not the same, thereby raising the probability that at any moment the free end of any one member is closely adjacent in a rotational sense to one pocket, so that in use the amount of rotation required in the engaging direction before engagement of at least one member and adjacent pocket is reduced as compared to the case where m=n.

Preferably the numbers n and m are selected so that in use engagement of more than one set each comprising one pawl member and an adjacent pocket may occur at the same time in a symmetrical manner about the co-axial axis, thereby distributing the load between more than one set of members and adjacent pockets and minimising asymmetry of forces within the clutch.

In a related aspect, the one-way clutch includes a resilient surface within the or each pocket against which a side of the member lies, permitting minor changes in the angle of rotation of the pawl member to occur when in the engaged position, so that relative dimensional imperfections are at least partially compensated and so that load sharing is facilitated between more than one engaged set.

Preferably the one-way clutch includes a resilient protrusion within the or each pawl member extending from a side of the member which protrusion, when in the engaged position, makes contact with a side of the pocket permitting minor changes in the angle of rotation of the pawl to occur when in the engaged position, so that dimensional imperfections are at least partially compensated and so that load sharing is facilitated between engaged pairs of pawls and pockets.

In a second broad aspect, the invention provides a one-way clutch as previously described in this section, wherein a directionally dependent biasing means is applied to the or each pawl member of the one-way clutch, so that in use the or each member is biased to extend towards a corresponding pocket when the relative movement of the first and second rings of the one-way clutch occurs in the engaging direction, and is biased to retract away from a corresponding pocket when movement is in the coasting direction.

Preferably the directionally dependent biasing means comprises (1) a beam attached by a first end to and extending to one side of the rod of the pawl member, perpendicular to the axis of rotation of the pawl member, (2) a second, free end of the beam held in dragging contact with a side surface of the apposing plate or annulus, so that in use relative motion in the engaging direction will apply a turning moment of force, derived from the dragging contact, to the rod and cause the pawl member to swivel about the pawl axis of rotation and thereby become extended outwards towards a pocket located upon the apposing plate or annulus, whereas motion in the coasting direction will tend to cause the pawl member to become retracted.

Preferably the pawl member is inertially balanced about the swivel axis so that acceleration does not cause deflection.

One alternative source of a dragging contact is a caster wheel mounted in rolling contact with the side surface of the apposing ring or plate, upon the free end of the beam.

Optionally an axis of rotation of the caster wheel is not parallel to the axis of rotation of the one-way clutch so that, when in use, the amount of drag is increased.

Another alternative source of dragging contact is a ball supported within a cup, mounted in rolling contact with the side surface of the apposing ring or plate, upon the free end of the beam.

Preferably the beam supporting the free end held in dragging contact with the side surface of the apposing plate or annulus exhibits resilience in a single axis (such as by a leaf spring) so that, when in use, the free end is maintained in dragging contact with the surface.

In a subsidiary aspect, the directionally dependent biasing means comprises a pattern of linear, slanting magnetised zones impressed into a ferromagnetically hard surface of an annulus bearing pockets, any one of the zones being capable of interaction with a ferromagnetic mass mounted rigidly and to one side of the pawl member in a position closely overlying the surface bearing the magnetised zones, so that in use motion in the engaging direction will tend to cause the mass to be attracted outwards and hence pull the pawl member outwards towards a pocket located upon the apposing ring, whereas motion in the sting direction will tend to repel the mass and cause the member to be retracted.

Preferably the ferromagnetic mass is ferromagnetically hard and is magnetised in a pattern complementary to that of the surface of the ring.

Yet another alternative source of dragging contact employs viscous material (such as grease) over a pattern of spiralling ribs impressed into an adjacent surface of the second frame support.

An even further source of dragging contact comprises a tracking contact arm sliding on an adjacent surface of the second frame support and capable of being directed by a pattern of spiralling ribs impressed into the surface of the second frame support; the spiral drawing the contact arm and hence the pawl into the pocket when backlash commences.

In a third broad aspect the invention provides a "worm clutch"; a reversible one-way clutch as previously described in this section, wherein the one-way clutch includes a geared transmission providing reversible coupling and decoupling effected within a gear coupling, including a first gear and a second gear, the coupling being of a type wherein the transmission of power has a positive efficiency when power is transmitted through the gear coupling from the first gear to the second gear, but a negative efficiency when power is transmitted from the second gear to the first gear.

Preferably the one-way clutch includes a gear train turned by the first shaft; the gear train including a controllable amount of backlash or dead motion, the first gear of the gear train being supported on the incoming drive shaft; the gear train being supported on a rotatable frame attached to the second shaft and terminating with a worm screw in engagement with a worm wheel, the worm wheel being attached to the first shaft, wherein the gear train has a ratio such that in use the screw of the worm travels at the same speed as the teeth of the worm wheel, and wherein the controllable backlash is predetermined so that when the gear train is turned by the first shaft in a coasting or free-wheeling direction the turning screw of the worm passes in between the teeth of the turning worm wheel with substantially no frictional contact, but when the gear train is turned by the first shaft in an engaging direction the controllable amount of backlash temporarily interrupts the drive to the worm screw, so that afterwards the screw of the worm rubs against the teeth of the worm wheel thereby causing the rotatable frame to rotate and hence causing the second shaft to rotate.

Preferably the controllable amount of backlash or dead motion is determined by controlling the amount of rotational clearance between at least one dog tooth and at least one dog of a loose dog clutch placed between the driving shaft and upon the first gear of the gear train, although optionally the backlash may be provided within the gear train itself In a subsidiary aspect, the direction of relative rotation for which the one-way clutch enters an engaged mode may be reversed by changing the orientation of the angular rotation, with respect to the first gear, through which the dog tooth may travel when in use.

PREFERRED EMBODIMENT

The descriptions of the invention to be provided herein are given purely by way of example and are not to be taken in any way as limiting the scope or extent of the invention.

This invention comprises, separately or in combination, three aspects of novel one-way clutch design. (A) is a "vernier" arrangement of mating pawls and pockets. (B) includes direction-sensitive systems for moving pawls into or out of engagement with sockets according to the direction of rotation. (C) is a further aspect, making use of a lockable gear train for driving a worm screw in one or another phase relationship to a worm wheel, within a frame.

EXAMPLE A

Vernier Principle

This aspect of the invention reduces noise and the backlash or dead motion effect seen in one-way clutches of the types relying on mating pawls and pockets (or the like) by providing a "vernier" relationship between pawls and pockets rather than a 1:1 correspondence (wherein the same number is on each of the driving and the driven shaft). Vernier principles are well known on micrometers and vernier calipers for instance.

Figure 1:
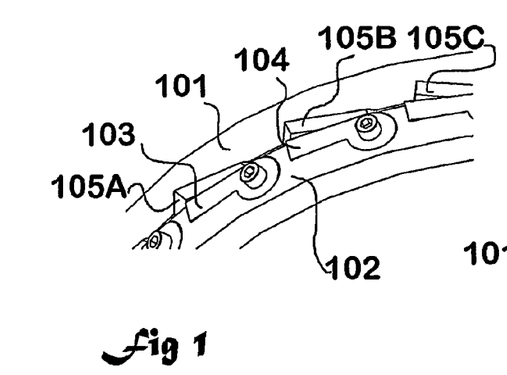
FIG. 1: is a diagram showing part of a one-way clutch according to Examples A and B, in the disengaged mode.
Figure 2:
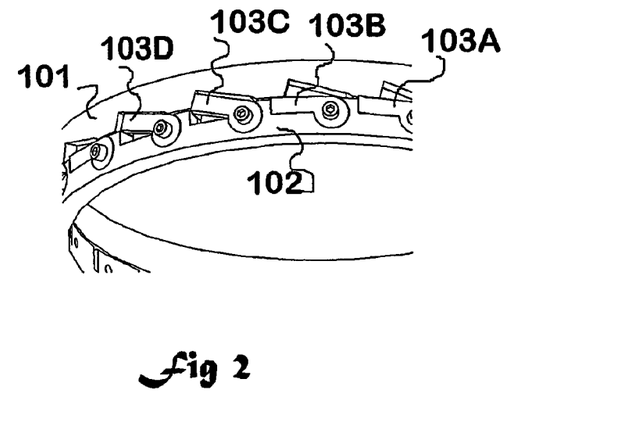
FIG. 2: is a diagram showing part of the one-way clutch of FIG. 1, in the engaged mode.
Figure 3:
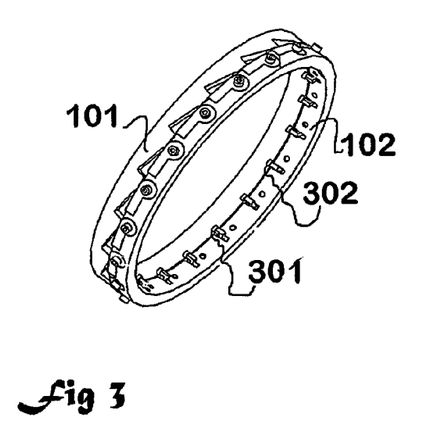
FIG. 3: is a diagram showing the interlockable components of a one-way clutch according to Examples A and B, in the disengaged mode.
Figure 4A:
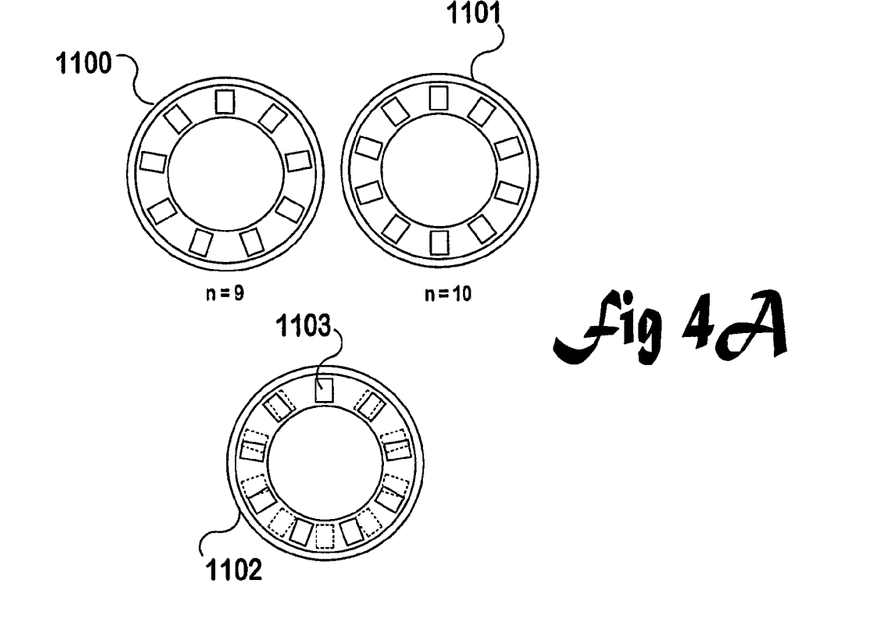
FIG. 4A: is a diagram showing a first face plate having 10 "engagement areas", a second face plate having 9 "engagement areas", and an overlay of the two showing the single (at most) possible point of coincidence.

FIGS. 1-3 show pawl and pocket type one-way clutches embodying the vernier principle. 101 and 102 indicate parts of annuli connected to first and second co-axial shafts. In FIG. 1, note how, because of the different numbers of items on apposing faces, pockets 105A, 105B, and 105C are out of step to a variable extent with adjacent pawls 103, 104, and 105. In FIG. 2, note that pawl 103C is in a position causing the clutch to be engaged, 103D is in the pocket but not in contact, and 103B is unable to enter a pocket. According to this example, there are n evenly dispersed pockets and m evenly dispersed pawls (where n and m are unequal integers), diagrammatically shown in X-ray face views in FIGS. 4A and 4B. FIG. 4A shows 9 pockets (or pawls) at 1100, and 10 complementary pawls (or pockets) in the "ring", 1101. In the overlay 1102 of the two rings, the single engaged pawl, fitting into a matching pockets is at 1103. The maximum backlash of this example is reduced by 9 times from 360/10=36 degrees of rotation to [360/10−360/9]=4 degrees of rotation.

Use of a single point of engagement may be a disadvantage in some applications; it is asymmetrical and all the power is transmitted through a single coupling, although the maximum impulse (kinetic energy) transfer occurring at first engagement is reduced (see illustrative Table 1) which reduces wear and possible damage. It may be preferable to have an engagement site located symmetrically on each side of the axis of rotation of the shafts of the one-way clutch by selecting n and m so that more than one sets of pawl-pocket matches, placed symmetrically about the shaft may become engaged so that eccentric loads on bearings, for example, are reduced.

Figure 4B:
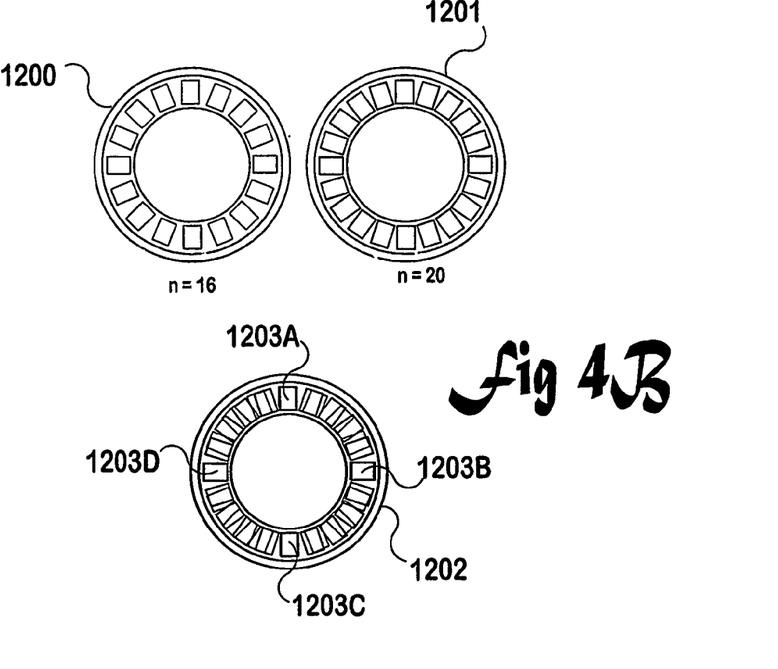
FIG. 4B: is a diagram showing a first face plate having 16 "engagement areas", a second face plate having 20 "engagement areas", and an overlay of the two showing the four possible points of coincidence.

FIG. 4B shows a multi-engagement alternative. In this illustrative example, m is 20 (ring 1201) and n (in ring 1200) is 16. Contacts (engagements) are allowed where the radial positions of any of the m pawls coincides with the position of any of the n pockets. FIG. 4B shows four sites of simultaneous engagement at 1203A, 1203B, 1203C, and 1203D in the overlay 1202 (for the m=20, n=16 case). The following Table 1 shows some variations. The column labelled "max impulse" indicates normalised rotational kinetic energy of impact with relation to an engagement of the one-way clutch. The concept of "maximum impulse" assumes that engagement commences at a worst-case position. The column labelled "max impulse per pawl" includes the number of pawls making simultaneous contact, given sufficient precision of manufacture. Although the specification refers to annuli (rings), the pawls and pockets may be mounted upon apposed plates or other flat surfaces.

TABLE 1

Engagement conditions, assuming 20 pawls.

| pocket (n) | pawl (m) | pawl contacts | max backlash | max impulse |
|---|---|---|---|---|
| 20 | 20 | 20 | 18.00° | 1.000 |
| 20 | 19 | 1 | 0.947° | 0.053 |
| 20 | 18 | 2 | 2.00° | 0.111 |
| 20 | 17 | 1 | 3.176° | 0.176 |
| 20 | 16 | 4 | 4.50° | 0.250 |
| 20 | 15 | 3 | 6.00° | 0.333 |
| 20 | 1 | 1 | 18.00° | 1.000 |

Note: the first row in Table 1 is a prior-art configuration, and the last row; 1 pawl and 20 pockets, is the type of prior-art configuration which would apply, for example, to a bicycle wheel where n and m are different, (one pawl) but backlash reduction is absent. Either or both of pawl and pocket numbers may be varied. In situations where only one pawl can engage, any one pawl should be capable of withstanding at least the total power to be transferred by this clutch according to this invention. Even so, the worst-case impulse force is substantially reduced. In this example, the conditions of 19, 18, or 16 pockets usefully reduce the transient forces occurring upon engagement by, in the worst case, about 19, 9, or 4 times respectively. In many cases the invention achieves its purpose sufficiently when the numbers n and m differ by 2, and the starting number is an even number of about the number of pawls/pockets available in an unimproved one-way clutch. If n and m differ by 2, two sets of pawls and pockets, placed symmetrically about the axis of rotation, carry the transmitted power within the clutch in a symmetrical manner. It will be evident to a skilled reader that many numbers may be used under a vernier configuration according to the invention, in various applications.

A general formula for applying the Vernier principle to this application may be written as follows:

a is an integer$\geq$1 (As a tends larger, so backlash tends to diminish)

b is an integer$\geq$1 (As b tends larger, so backlash tends to diminish)

m is a product of a and b, ie m=ab n is a product of (a+1) and b, ie n=b(a+1)

Then for a circle of 360 degrees, the number of coincident points=b, and the maximum backlash is (360* b)/(m*n).

Example, take a=17, and b=3.

m=17×3=51.n=18*3=54.

No. coincident points b=3.

Maximum backlash=(360*3)/51*54)=1080/2754=0.392 degrees.

Wear, noise and vibration are minimised by use of the "vernier" approach to pawl and pocket spacing. Assuming use of a biasing means such as a spring, then according to the invention clicking noises are no longer created simultaneously at all sets of pawl and pocket in the clutch; clicks are now spaced apart from each other. If m=20 and n=19, there are about 380 clicks per revolution, each one from a single pawl and pocket set, hence reducing noise which is also of higher frequency and hence easier to absorb than the original noise. (If n and m=20 in a prior-art configuration, there would be 20 clicks from all 20 sets of pawls and pockets, occurring in unison, per revolution.

When the one-way clutch comes into action, the amplitude of any impulse-related vibration or noise is reduced because worst-case backlash is less than prior-art devices. This is because the kinetic energy of the relatively rotating parts is not able to build up to as great an amount before the one-way clutch comes into action. This is of particular use in large energy conversion devices such as wind power generators, which experience fluctuations of input power, and in some versions of sea wave power conversion devices. The engagement impulse can provide excess loadings in many connected parts of a power transmission and cause failure of a variety of components. If the engagement impulse is the main cause of wear of pawls, it follows that optimised pawls can now be made smaller and lighter. Less mass means faster movement. The invention gives less wasted (reverse) motion, as in the example of Table 1.

This process of design creates an improved one-way clutch suitable for use as a new part, or as a replacement part for many types of one-way (or overrunning) clutch.

EXAMPLE B

Example B provides direction-dependent biasing for pawls, switching those connecting elements of the one-way clutch between an engaged and a disengaged mode according to the relative driven direction of the shafts. The usual prior-art constant spring bias tends to cause eventual wear of rubbing parts and "slap" noise arising whenever the one-way clutch is operated in a free-wheeling direction, caused when the pawl edges pass over the pocket edges in the anti-engagement direction and drop into the pockets. This aspect of the invention is complementary to Example A although either aspect can be implemented without the other. Examine B provides means dependent on relative motion of the shafts of the one-way clutch that cause engagement in particular.

Figures 5A, 5B, 5C, 5D:
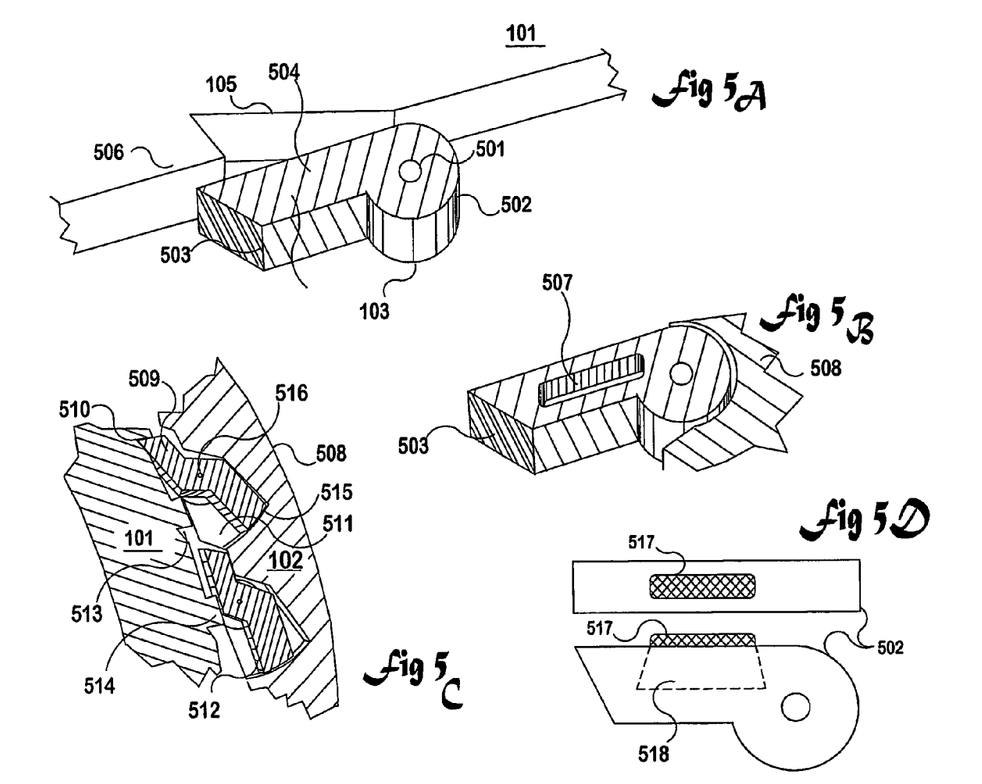
FIG. 5A: is a diagram of a pawl and a corresponding pocket.
FIG. 5B: is a diagram of a pawl with some weight redistribution.
FIG. 5C: is a diagram of pawls having centres of gravity upon their axes of rotation, and corresponding pockets.
FIG. 5D: shows a pawl with added resilience.

One type of pawl shape according to this invention is as shown in FIG. 5A, wherein a pawl 103 is comprised of an end face 503 capable of reaching into a nearby pocket in the other ring of the one-way clutch, a body 504, providing a rigid shaft or arm to the pawl, and a rounded bearing face 502 which is concentric about (a) an optional mounting hole 501 about which the pawl may pivot in order to change between an engaged, protruding state, and a disengaged, concealed state and lies within (b) a rounded cavity in an annulus 102 (see FIG. 5B). During engagement, thrust is carried between the end face 503 and the rounded face 502. The height of the pawl may be varied according to application; longer faces can safely carry more power but a greater mass is slower to move. The retaining bolt 104 (such as cap screws in FIG. 1a-c) may be replaced by simply extending the encompassing joint further around the rounded face of the pawl, and using a circlip to prevent the pawls from flying or dropping out, but individual retaining bolts allow easier assembly and maintenance. Optionally the pawl is retained within a cage or the like. The pivot does not normally carry a load. Optionally the end face 503 is sloped in order to secure a positive engagement within the pocket (by ensuring that the pawl is pushed into the pocket. Preferably the attitude of the end face is such that it makes contact with substantially the whole face 506 of the pocket formed in the other ring 101 of the one-way clutch. That face 506 may be made slightly re-entrant.

Because most of the force transmitted by the pawl emerges at the pawl end 503 rather than along the side of the body 504 in contact with the annulus 101 (referring to FIG. 5A) it is possible to place a resilient material into either the side of the pocket 105, or (see FIG. 5D) the side and extending into the interior 518 of the pawl beam 504 in order to take up slight variations of coupling geometry, allow slight variations in the angle made by each pawl around its axis of rotation, and thereby equalise loadings between different sets of pawls and pockets in simultaneous use. It may be more convenient to apply a coating or an insert to each pawl after other manufacturing steps are completed, and they are more easily replaceable if the coating wears.

Some pawls, some of which are described or drawn in this specification, exhibit the deficiency that their masses are not balanced about the axis of rotation, which should also be the centre of gravity. If the entire device were to be accelerated, unbalanced pawls would therefore experience a turning moment and be deflected which would affect the proper operation of the one-way clutch.

Figure 10:
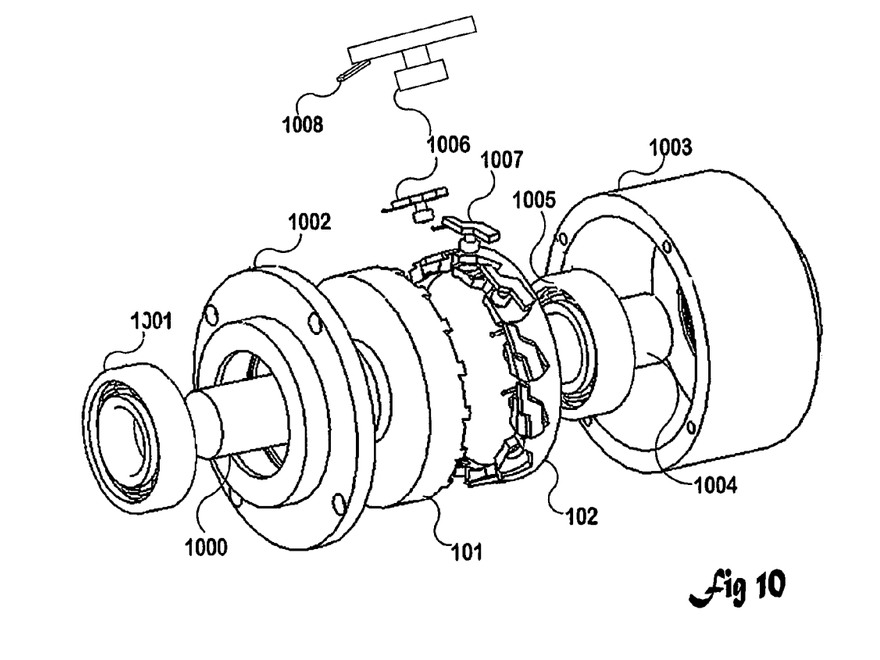
FIG. 10: is a perspective view of a one-way clutch employing balanced pawls symmetrical about their pivotal axes, and corresponding pockets.

It is useful to provide an inertially balanced pawl for use in situations where any biasing force applied may be unable to dominate effects of accelerations (such as gravity). The pawl of FIG. 5A may be made inertially more symmetrical such as by removal of mass where possible along the body, as shown in FIG. 5B where 507 indicates a cavity. FIG. 5C is a diagram of an improved pawl intended to be inertially symmetrical about the centre of gravity. In FIG. 5C, which shows a portion of a one-way clutch, the apposed annuli 101 and 102 include a vernier layout; pawl 509 (which pivots about mounting axis 516) is shown in an engaged position where it is capable of transmitting a force between the pocket 510 of 101 and the curved face of the cavity 515. Also in FIG. 5C, protrusions 514 comprise a further method to maintain the pawls out of the pockets during an over-running mode. FIG. 10 shows a practical embodiment of an entire clutch according to this version.

Figures 6A, 6B:
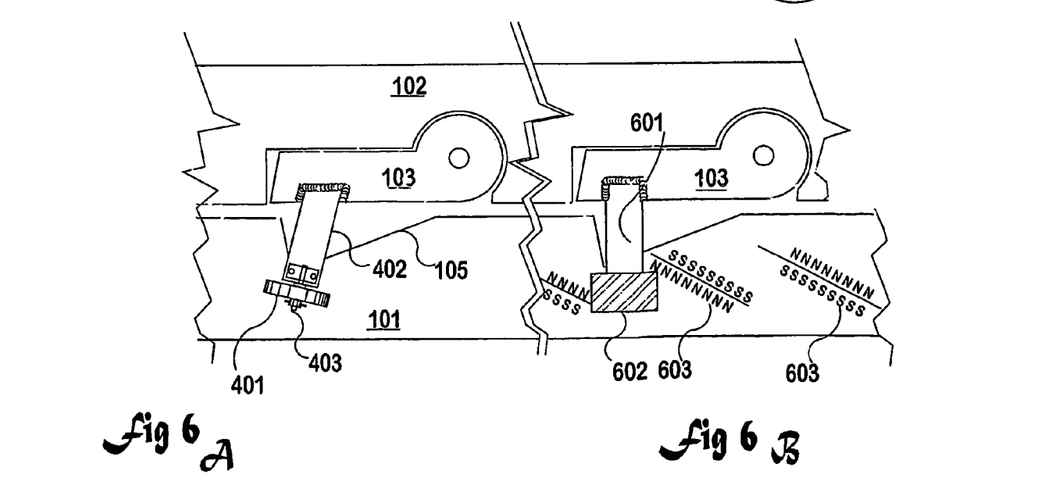
FIG. 6A: shows a caster system for dragging each pawl into or away from an engagement position according to relative rotational movement of the parts of the clutch.
FIG. 6B: shows a magnetic system for dragging each pawl into or away from an engagement position according to relative rotational movement of the parts of the clutch
Figures 7, 8A, 8B:
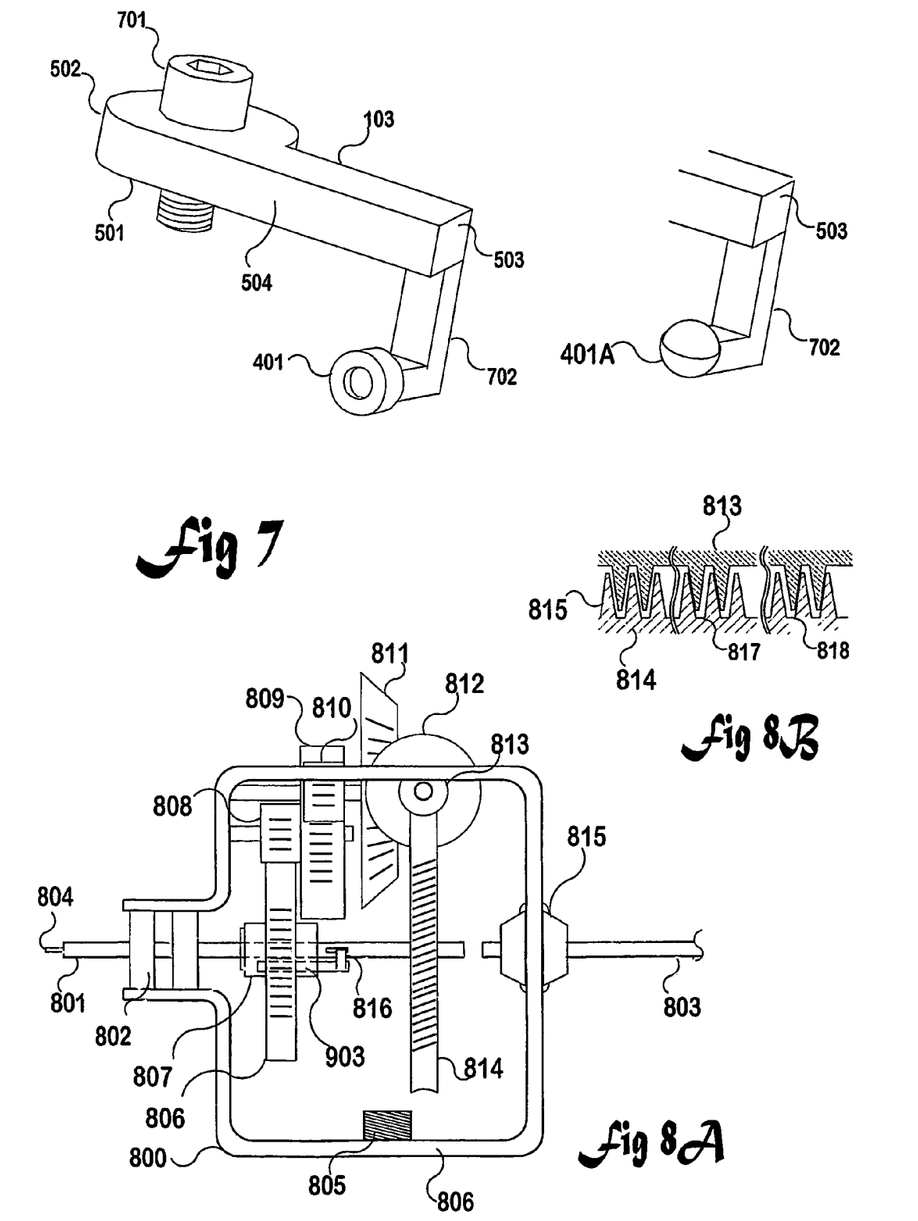
FIG. 7: is a diagram of a pawl with a caster wheel beneath.
FIG. 8A: is a diagram of a "worm clutch"; a one-way clutch making use of a gear train inside a frame.
FIG. 8B: is a cross-section of the relationship between the worm screw and the worm gear.

Extensions reaching from each pawl and interacting with the annulus 101 carrying pockets can provide a direction-dependent bias for causing each of the pawls to pivot about its pivotal axis. See FIGS. 6A and 6B, 7 and 10, which show some of the possible options; One wheel 401 may be attached at the end of a beam 402 to each pawl (se: FIG. 6A, 7). The extension 402 may have resilience (may be a leaf spring) and be adjusted. in order to provide a force holding the wheel against a surface, comprising the (relatively) moving annulus below. Alternatively the wheels (and/or the substrate) may be covered with a resilient material such as rubber. The effect of any friction between the wheel and the substrate is to provide a turning moment that tends to pull the pawl out into the pocket under conditions when the one-way clutch should become engaged—as when annulus 101 moves to the right in relation to annulus 102. Preferably the axis of the wheel is mounted at an oblique angle (as shown) to the direction of movement of the underlying surface 101 so that the enforced sideways friction of the wheel against the substrate drags the beam 402 and provides a more directional torque to the pawl. This method may benefit by due attention to possible wear between the wheel and the surface 101. It may be better to use a first surface, possibly an end of a leaf spring (see 1008 in FIG. 10), running over a second surface. Preferably contact and rubbing is avoided by use of a relatively viscous lubricant. The angle of deflection should be enough to initiate pawl movement when required, but not so much as to cause undue wear during free-wheeling. In that case the leaf spring is simply to provide a wear-independent amount of contact, but not the prior-art non-directional restoring force.

Another directionally dependent biasing device (see FIG. 6B) is a mass of magnetically soft iron 602 on the end of the beam 601, which is either pulled out or pushed in by a dragging effect from a repeating pattern of sloping magnetic poles (603, 603') imprinted on a surface below. The imprinted poles result in concentrated magnetic fields along the poles. Imprinting can be done by magnetising a hard ferrite collar (for example), or a magnetically hard steel with a suitably shaped wound polepiece (perhaps also making use of the Curie transition temperature of iron or ferrite). This approach has the advantage that there is no actual frictional contact between each iron mass and the moving surface (the annulus) below the mass. A viscous material (such as grease) in combination with a pattern of spiralling ribs may work in a similar way, although a long period of free-wheeling would heat the viscous material so that it would exert less drag. A physical probe may alternatively be used to trace the outlines of the pattern of ribs and drag each pawl accordingly. There are a number of other solutions to providing a direction-dependent bias any of which will be clear to one versed in the art. For example, a spring or the like may normally apply an outwards push but the action of the spring is opposed by a directionally dependent biasing means during relative movement in the first direction, so that the one-way clutch has a backup biasing means.

FIG. 7A shows how the wheel 401 may be located on a beam 702 so as to run beneath the annulus 101. FIG. 7 shows yet another alternative; a ball revolving inside a cup 401A (preferably with lubrication). Balancing of the mass of the pawl is not illustrated here, for clarity.

Action of the clutch is shown in FIGS. 2 and 3. FIG. 3 shows the clutch in a coasting or free-wheeling mode, allowing relative movement between ring 101 and ring 102, and FIG. 2 shows the clutch in an engaged mode with pawl 103C carrying thrust, and no relative movement between the ring faces.

FIG. 10 shows a practical one-way clutch embodying the principles previously described in this section. 1000 is a first shaft; 1004 is a second shaft Bearings 1001 and 1005 support the shafts. A protective casing is comprised of cup 1003 and cover 1002. First annulus 101 includes pockets and protrusions (see description to FIG. 5C which is an enlargement of the working portion of the clutch of FIG. 10). Two pawls and their associated pivot assemblies are shown in "exploded view" at 1006 and 1007, and 1006 is enlarged at 1008. These pawls are balanced about their centres of rotation. Each includes a leaf-spring form of directional moment applying means 1008 which (like that of FIG. 7A and 7B runs on the inner side of the annulus 101. The leaf spring comprises a component exhibiting resilience in a single axis and is used to maintain the free end in dragging contact with the surface.

EXAMPLE C

This Example is referred to herein as a "worm clutch". In this version of a one-way clutch, thrust is carried during engagement by the surface of the worm screw, not by colliding sprags, rollers, pawls, or the like. This Example (see FIGS. 8 and 9) makes use of the negative efficiency that is inherent to some high-ratio gear couplings, such as but not limited to the case of worm wheels driving worm screws, causing the transmission of power to be not effectively reversible. The vector of an applied force at the worm screw face that would cause rotation is too small to overcome friction.

FIG. 8A shows the overall structure. First shaft 801 is firmly connected to worm wheel 814 and is connected through a tooth 901 within a cavity providing a type of dog clutch 807 providing a controlled amount of backlash to the concentric first drive pinion 806. (The first pinion may also be a bevel gear). The frame 800 is free to rotate about the first shaft 801 (using bearings 802). The frame 800, which supports the gear train and worm screw (813) mounting is rigidly connected (at 815) to a second shaft 803. The gear train (806, 808, 809, 810) driven by the first shaft 801 includes a right-angle drive and is capable of driving the worm screw 813 in either a first phase (free, without contact) or a second phase (in contact and with static friction) phase relationship to the worm gear 814, but otherwise at the same rate. When the assembly is being driven in a first direction and the clutch is free-wheeling, not driving, the driven gear train makes the worm rotate at a speed (and in a phase) which results in the thread of the turning worm screw 813 passing between the teeth of the worm wheel 814 with substantially no rubbing contact or resulting friction. In effect the worm 813 screws itself around the wheel 814 at exactly the rate of turning of the frame, relate to the input shaft Synchronisation is determined by the gear train ratio. The proper phase will be set during construction or installation. In this free-wheeling direction the gears turn freely, the frame is not forced to rotate, and there is no coupling between the input shaft 801 and the output shaft 803.

See FIG. 8B, where details of the engagement between the worm screw 813 and worm wheel 814, in a disengaged (815, at left, with no contact) position, engaged for rotation in a first relative sense in 817, and alternatively engaged in a second relative sense in 818 are shown in a longitudinal sectional view. In normal use, the system would either alternate between 815 and 817 or, after being reconfigured, to alternate between 815 and 818.

The controlled backlash has the effect of moving the worm screw slightly along the worm gear —analogous to a change in phase of an AC electrical signal. In the event of contact, the clutch is engaged in that the worm gear 814 is locked to the worm screw 813, whereupon the frame 800 is made to spin by the first (input) shaft 801, thereby driving the second (output) shaft 803. The counterweight 805 serves to balance the mechanism although an alternative version with dual worm wheels is inherently balanced. It should be noted that drive power may instead arrive at the second shaft 803 and be removed from the worm clutch at first shaft 801.

In addition, this worm clutch is reversible in terms of the relative direction which can over-run and which direction is locked. The relative direction which causes engagement may be changed from positive to negative by altering the part responsible for the controlled backlash. In FIG. 8 a part of a preferred reversing mechanism is shown; a coaxial central push rod 804 within shaft 801 (which rod may be operated during operation of the transmission) emerges behind pinion 806 as arm 816, which arm is connected to and may advance or retract a wedge 903 into the space used as a dog clutch. (See FIG. 9, A, B and C).

When the assembly is being driven in a second (opposite) direction and the clutch is now intended to serve as a coupling between driving and driven shafts, the backlash—conferring means 807 built into the mounting of the spur gear 806 (together with any incidental backlash in the driven gear train) changes the speed of the worm while the backlash is interrupting the drive to the worm, so that when the worm is again driven it will tend to rotate at the same speed but in a phase which results in one side of the thread of the worm coming against the teeth of the worm wheel. Force applied now tries to have the worm wheel turn the worm screw. In usual conditions, some friction overcomes the small turning moment of the applied force and "negative efficiency" prevails. Specific conditions may be important; for example we consider it useful that the worm screw is dry. As a result the locked pair of gears causes the clutch to transmit power from the driving shaft 801 via the frame 800 to the driven shaft 803. During a change in state, there may be a transfer of momentum from the worm screw to the worm gear. (Please note that the diagrams of FIGS. 8 and 9 are purely illustrative and do not show correct ratios).

Figure 9:
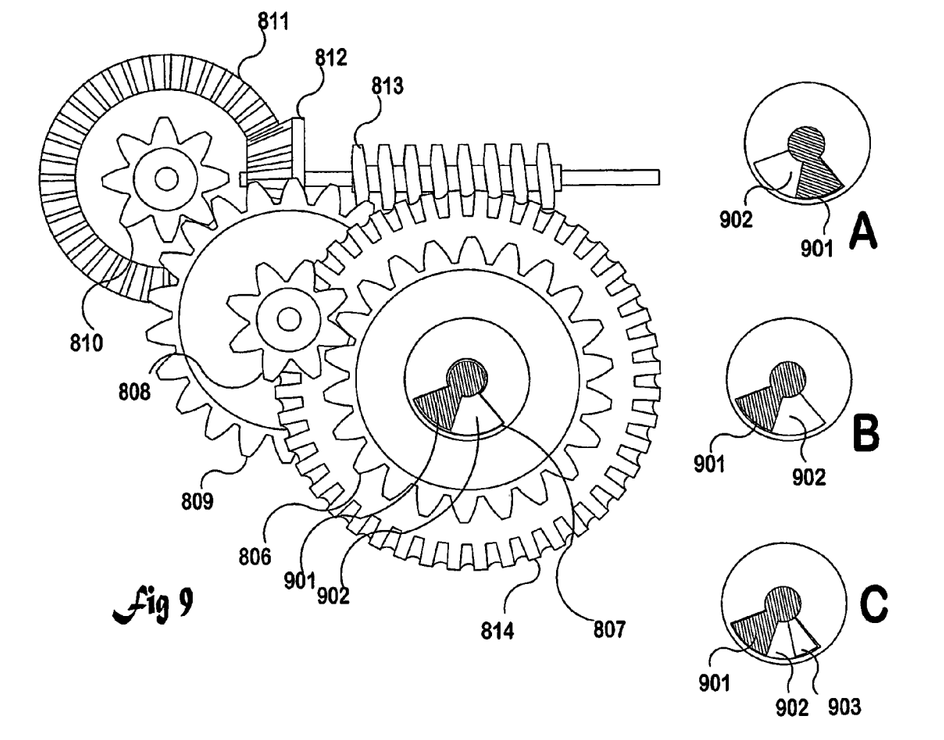
FIG. 9: is a diagram of the gear train and worm, with drive options.

Assuming little backlash in the gear train 806-812, deliberate backlash is provided for as shown in FIG. 9. The shaded sector-like tooth 901 is rigidly coupled to the drive shaft 801, and can rotate to a limited degree within a sector-shaped cavity 902, forming a type of a dog clutch, within pinion gear 806. In a first direction (A) the tooth hits the counterclockwise face of the cavity, and in a second direction it turns by a small extent (exaggerated in the drawing) to hit the clockwise face, so that the phase relationship of the worm wheel 814 (rigidly coupled to the input shaft) and the screw 813 is altered. Reversal of operating direction can be imposed by addition of a wedge 903 within the cavity on one side or the other of the tooth, as previously described. This may be done by a mechanic during maintenance, or may be done during operation using the push rod 804. A symmetrical two-tooth version may be preferred.

This apparently complex mechanism has a number of advantages including the purpose of avoiding concentrated loadings (together with impact components), such as those that occur in wedging or pawl-based one-way clutches. Instead, the loading is spread over the larger contact area, the "effective face width" between the worm thread and the worm gear. The usual lubricated rubbing surfaces should make rubbing contact only during transitional periods.

VARIATIONS

The examples shown here are purely illustrative. One-way clutches may be used in a great variety of applications each of which has a particular set of requirements, such as low noise, high reliability, suited to high or low speeds, and/or coupling or not of high shaft torques. A variety of new applications may be made feasible by improved performance.

COMMERCIAL BENEFITS OR ADVANTAGES

Lower backlash is provided by means of the vernier alignment of pawls and pockets, so that a "first available pawl-pocket" alignment occurs with significantly less angular movement than in prior art devices. This reduces noise upon engagement and lost backwards motion.

Lower noise during over-running is provided by means of the verner alignment of pawls and pockets, so that the clicking caused by pawls running over pockets in the free-wheeling mode (if biased to do so) is asynchronous and at a significantly higher rate.

Lower noise is also provided by means of the directionally dependent bias system of steering the pawls into or out of the pockets, so that they do not run over the edges of the pockets and drop into the pockets when turning in the free-wheeling direction.

Higher reliability is provided by lower backlash, so that development of reverse momentum and resulting impact force is significantly less.

Higher reliability is provided by avoidance of the wedging of parts against each other involving a high amount of locally applied force, so avoiding deterioration of materials and a short service life.

The geared system provides the same advantages, namely minimal free-wheeling losses, is positively driven when in the engaged mode, and comprises a non-wedging version of one-way clutch.

Finally, it will be understood that the scope of this invention as described and/or illustrated herein is. not limited to the specified embodiments. Those of skill will appreciate that various modifications, additions, known equivalents, and substitutions are possible without departing from the scope and spirit of the invention as set forth in the following claims.

I claim:

1. A one-way clutch for providing coupling between a first rotatable shaft having an axis of rotation, and a second, abutting rotatable shaft having a co-axial axis rotation, the one-way clutch being capable of coupling the shafts if the first shaft is rotated in an engaging direction relative to the second shaft but of uncoupling the shafts if the first shaft is rotated in an opposite coasting direction relative to the second shaft;
    characterised in that the one-way clutch includes a resilient surface within the or each pocket against which a side of the member lies, permitting miner changes in the angle of rotation of the pawl member to occur when in the engaged position, so that relative dimensional imperfections are at least partially compensated and so that load sharing is facilitated between more than one engaged set.

2. The one-way clutch as claimed in claims 1, characterised in that the one-way clutch includes a resilient protrusion within the or each pawl member extending from a side of the member which protrusion, when in the engaged position, makes contact with a side of the pocket permitting minor changes in the angle of rotation of the pawl to occur when in the engaged position, so that dimensional imperfections are at least partially compensated and so that load sharing is facilitated between engaged pairs of pawls and pockets.

3. A one-way clutch for providing coupling between a first rotatable shaft having an axis of rotation, and a second, abutting, rotatable shaft having a co-axial axis of rotation, the one-way clutch having a plurality of pawl members, each pawl member having an axis of rotation, a first engaging face, and a second engaging face; characterised in that the one-way clutch includes a directionally dependent biasing means applied to each pawl member; said biasing means comprising a dragging contact with a side surface of the apposing plate or annulus; the dragging contact being generated by a caster wheel mounted in rolling contact with the side surface upon the free end of the rod.

4. The one-way clutch as claimed in claim 3, characterised in that an axis of rotation of the caster wheel is not parallel to the axis of rotation of the one-way clutch so that, when in use, the amount of drag is increased.

5. The one-way clutch as claimed in claim 3, characterised in that the dragging contact is generated by a ball, supported within a cup, mounted in rolling contact with the side surface of the apposing ring or plate, upon the free end of the rod.

6. The one-way clutch as claimed in claim 3, characterised in that the beam supporting the free end held in dragging contact with the side surface of the apposing plate or annulus exhibits resilience in a single axis so that, when in use, the free end is maintained in dragging contact with the surface.

7. The one-way clutch as claimed in claim 3, characterised in that the directionally dependent biasing means comprises a pattern of linear, slanting magnetised zones impressed into a ferromagnetically hard surface of an annulus bearing pockets, any one of the zones being capable of interaction with a ferromagnetic mass mounted rigidly and to one side of the pawl member in a position closely overlying the surface bearing the magnetised zones, so that in use motion in the engaging direction will tend to cause the mass to be attracted outwards and hence pull the pawl member outwards towards a pocket located upon the apposing ring, whereas motion in the coasting direction will tend to repel the mass and cause the member to be retracted.

8. The one-way clutch as claimed in claim 3, characterised in that the ferromagnetic mass is ferromagnetically hard and is magnetised in a pattern complementary to that of the surface of the ring.

9. A one-way clutch for providing coupling between a first rotatable shaft having an axis of rotation, and a second, abutting, rotatable shaft having a co-axial axis of rotation, the one-way clutch being capable of coupling the shafts if the first shaft is rotated in an engaging direction relative to the second shaft but of uncoupling the shafts if the first shaft is rotated in a opposite, coasting direction relative to the second object, characterised in that the one-way clutch includes a) a first support frame, plate, or ring held upon the first shaft and supporting a first integer number n, greater than one, of pawl members each having a free end and a supported end separated by a rigid portion, each member being evenly spaced about a co-axial locus on a first end face of the first ring and the free end of each being directed towards a second support frame or ring, b) the second support frame, plate, or ring, held upon the second shaft and adjacent to the first ring and supporting a second integer number m, greater than one, of pockets each capable of receiving a free end of one of the members, each pocket being evenly spaced about a co-axial locus on a second end face of the second ring, each pocket being capable of reversibly engaging with an apposed member, c) wherein the numbers n and m are not the same, thereby raising the probability that at any moment the free end of any one member is closely adjacent in a rotational sense to one pocket, so that in use the amount of rotation required in the engaging direction before engagement of at least one member and adjacent pocket is reduced, characterised in that the numbers n and m are selected so that in use engagement of more than one set each comprising one pawl member and an adjacent pocket may occur at the same time in a symmetrical manner about the co-axial axis, thereby distributing the load between more than one set of members and adjacent pockets and minimising asymmetry of forces within the clutch, and characterised in that the one-way clutch includes a resilient surface within the or each pocket against which a side of the member lies, permitting minor changes in the angle of rotation of the pawl member to occur when in the engaged position, so that relative dimensional imperfections are at least partially compensated and so that load sharing is facilitated between more than one engaged set.

10. The one-way clutch as claimed in claim 9, characterised in that the one-way clutch includes a resilient protrusion within the or each pawl member extending from a side of the member which protrusion, when in the engaged position, makes contact with a side of the pocket permitting minor changes in the angle of rotation of the pawl to occur when in the engaged position, so that dimensional imperfections are at least partially compensated and so that load sharing is facilitated between engaged pairs of pawls and pockets.

* * * * *